United States Patent [19]
Verboom

[11] Patent Number: 6,094,408
[45] Date of Patent: Jul. 25, 2000

[54] ADAPTIVE AND SELECTIVE CANCELLATION OF INTER-SYMBOL INTERFERENCE OF A READ CHANNEL IN STORAGE TECHNOLOGIES

[75] Inventor: Johannes Jacobus Verboom, Colorado Springs, Colo.

[73] Assignee: Philips Electronics North America Corporation, New York, N.Y.

[21] Appl. No.: 09/105,856

[22] Filed: Jun. 26, 1998

[51] Int. Cl.[7] .................................................. G11B 5/76
[52] U.S. Cl. ...................................... 369/59; 369/124.05
[58] Field of Search .................................. 369/47, 48, 49, 369/53, 54, 59, 124.01, 124.05, 124.15; 360/26, 32, 45

[56] References Cited

U.S. PATENT DOCUMENTS

| | | |
|---|---|---|
| 4,564,952 | 1/1986 | Karabinis et al. . |
| 5,331,662 | 7/1994 | Desperben et al. . |
| 5,563,864 | 10/1996 | Kobayashi et al. ........................ 369/59 |
| 5,724,330 | 3/1998 | Kobayashi et al. ........................ 369/59 |

*Primary Examiner*—Paul W. Huber
*Attorney, Agent, or Firm*—Michael Schmitt

[57] ABSTRACT

A method, circuit and system for canceling inter-symbol interference from samples of a read signal in storage technologies. A circuit embodying the present invention includes sample logic, arithmetic logic and cancellation logic. The sample logic receives samples and provides a main sample and one or more selected neighbor samples. The arithmetic logic compares the main sample to the neighbor samples toward determining satisfaction of selected cancellation criteria. If the selected cancellation criteria are satisfied, the cancellation logic selectively and adaptively effects ISI cancellation as to the main sample. A method embodying the present invention comprises obtaining an ISI cancellation value in association with a reference field of the read signal; sampling the read signal at channel bit locations to provide a plurality of samples; selecting a main sample from the plurality of samples; selecting one or more neighbor samples from the plurality of samples, the neighbor samples being disposed at predetermined distances, in channel bits, from the main sample; comparing the main sample to each of the neighbor samples to determine satisfaction of selected cancellation criteria; applying, where the cancellation criteria are determined to be satisfied, the ISI cancellation value to the main sample.

19 Claims, 3 Drawing Sheets

ADAPTIVE AND SELECTIVE CANCELLATION OF INTER-SYMBOL INTERFERENCE OF A READ CHANNEL IN STORAGE TECHNOLOGIES

RELATED APPLICATION

U.S. patent application of Johannes J. Verboom and Fred N. Wamble, Ser. No. 08/994,874, filed Dec. 19, 1997, and entitled METHOD AND APPARATUS FOR MAXIMUM LIKELIHOOD DETECTION, is hereby incorporated by reference.

BACKGROUND OF THE INVENTION

The invention relates generally to data recovery of storage technologies, and more particularly to systems, methods, apparatuses and systems for data recovery by adaptive and selective cancellation of inter-symbol interference of a read channel of storage technologies.

Advances in manufacturing technologies and system architecture have led to increasingly powerful consumer electronic devices and computers. These consumer electronic devices and computers support features and applications, such as multimedia, in connection with which vast amounts of information are processed and stored. Generally, the amount of information is not only vast, but also ever-increasing.

To provide the information, storage technologies have been developed, including magnetic, optical and magneto-optical technologies. Although these technologies provide relatively large storage capabilities, the technologies generally demand ongoing improvement so as to overcome factors limiting storage capacity. Among other areas for ongoing improvement is the accurate detection of recorded data, particularly while increasing the recording density.

Detection of recorded data is conventionally accomplished using a threshold. As an example, channel bits of an optical read channel (using, for example, 1,7 run-length-limited modulation coding) are detected by comparing a read signal to a predetermined threshold: if the read signal exceeds the threshold at a particular channel-bit location, that channel-bit is considered a '1' (i.e., a mark); otherwise the channel-bit is considered a '0' (i.e., a space).

Detection against a threshold relies on setting an appropriate threshold. Generally, the threshold is set toward recovering recorded information within an acceptable bit error rate. To do so, the threshold optimally is set to the center of an "eye-pattern", the eye-pattern being a measure that indicates the amplitude and phase margins of the read signal. However, the read signal's amplitude and phase margins tend to be affected by various parameters, including, among others, the write power, the write sensitivity of the media, the quality of the spot of the write and read drives (e.g., mark size variations), and the focus offset of the write and read drives. Because these parameters vary across systems and media, the center of the eye pattern tends to vary and, in turn, the optimal threshold setting tends to vary.

Moreover, increasing recording density tends to increase inter-symbol interference ("ISI"). Recording density is associated with, e.g., reduction in channel-bit length and/or, for optical disk media, variation in radial position. Inter-symbol interference, in turn, tends to raise the level of the read signal of spaces between adjacent marks. If such raised level approaches or exceeds the threshold, the bit error rate generally increases.

Accordingly, it is desirable to provide for accurate detection of recorded data while accommodating increased recording density.

SUMMARY OF THE INVENTION

Toward driving storage technologies forward, methods, circuits and systems are provided for canceling inter-symbol interference from samples of a read signal. An advantage of the method, circuit and system is the improvement of detection of recorded data at enhanced recording density.

A circuit embodying the present invention includes sample logic, arithmetic logic and cancellation logic. The sample logic receives samples and provides a main sample and one or more selected neighbor samples. The arithmetic logic compares the main sample to the neighbor samples toward determining satisfaction of selected cancellation criteria. If the selected cancellation criteria are satisfied, the cancellation logic selectively and adaptively effects ISI cancellation as to the main sample.

A method embodying the present invention comprises obtaining an ISI cancellation value in association with certain reference marks of the read signal; sampling the read signal at channel bit locations to provide a plurality of samples; selecting a main sample from the plurality of samples; selecting one or more neighbor samples from the plurality of samples, the neighbor samples being disposed at predetermined distances, in channel bits, from the main sample; comparing the main sample to each of the neighbor samples to determine satisfaction of selected cancellation criteria; and applying, where the cancellation criteria are determined to be satisfied, the ISI cancellation value to the main sample.

The various features of novelty which characterize the invention are pointed out with particularity in the claims annexed to and forming a part of this specification. For a better understanding of the invention, its operating advantages and specific objects attained by its use, reference should be made to the accompanying drawings and descriptive matter in which its preferred embodiments are illustrated and described, wherein like reference numerals identify the same or similar elements.

DETAILED DESCRIPTION

Terminology

Read channel, as used herein, refers to optical, electrical, magnetic and mechanical elements that deliver signals from the surface of recording media to processing elements for conversion to formats convenient for a user.

K-constraint, as used herein, refers to the maximum number of consecutive logical zeroes (or ones) in any sequence of binary channel bits, in which the logical ones (zeroes) represent the location of signal transitions.

D-constraint, as used herein, refers to the minimum number of consecutive logical zeroes (or ones) in any sequence of binary channel bits, in which the logical ones (zeroes) represent the location of signal transitions. The d-constraint is employed to determine the distance between samples for evaluation in selecting channel bits subject to ISI cancellation, as described more fully below.

Cancellation of inter-symbol interference ("ISI"), as used herein, refers to the reduction of ISI, either in whole or in part. Advantages of such cancellation include improving the detection of the logical polarity (i.e., '1' or '0') of channel bits of a read signal.

Overview

Embodiments of the present invention derive ISI cancellation values to apply to selected channel bits, the derivation relying on the employ of predetermined reference marks. In a preferred embodiment, ISI cancellation values are derived from a detected ISI value obtained in relation to such reference marks. Embodiments of the present invention also provide for adaptively canceling ISI, e.g., by adaptively obtaining detected ISI and/or adaptively deriving ISI cancellation values. In each case, the detected ISI and/or ISI cancellation values may, but need not, equal the actual ISI affecting the reference marks and/or any channel bit.

Reference Marks

In an illustrative embodiment of the present invention, a disk is formatted to comprise a plurality of tracks, each track including a selected number of segments (e.g., 225), and each segment having a selected number of frames (e.g., 16). Each frame comprises one or more fields. The fields contain pre-formatted marks that are employed to provide selected functions, including, among others, clock synchronization, track following, track capturing, addressing and track counting.

Each frame also comprises a recordable field. The recordable field is provided for recording user data. The data is organized in logical sectors, each sector preferably beginning at a frame boundary. Each sector comprises a selected number (e.g., 1024 or 2048) of data bytes, together with other information. Such other information provides one or more functions including, among others, error correction.

Figure 1:
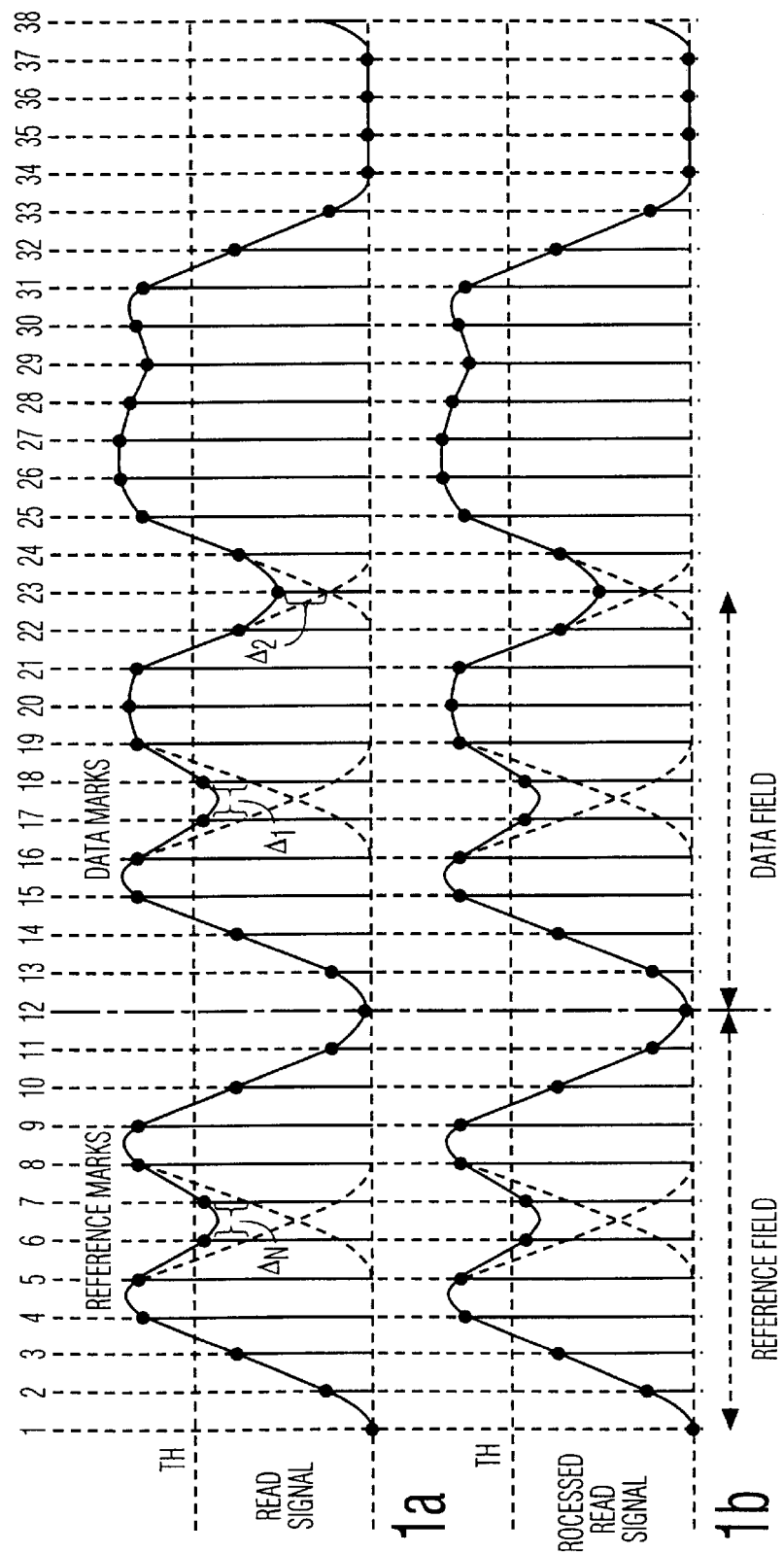
FIG. 1(a) shows a read signal, the read signal having reference marks and data marks, including spaces subject to ISI.
FIG. 1(b) shows a processed read signal, the read signal having reference marks and data marks, including spaces subject to ISI cancellation.

FIGS. 1(a) and (b) show typical read signals of a read channel, according to the present invention. Each read signal includes (i) reference marks and spaces in a reference field and (ii) illustrative data marks and spaces in a data field, the data marks comprising user data. Although the illustrated read signals are analog, each preferably is processed as discrete values sampled at a selected frequency.

In FIG. 1(a), samples 13, 14, 17, 18, 22, 23, 24, 32, and 33 correspond to spaces in the data field. While these samples are depicted as non-zero, they represent binary zeroes. The samples are so depicted to illustrate bandwidth limitations associated with resolution. However, samples 17, 18, and 23 are also so depicted to illustrate the effect of ISI. For sample 17, the amount of ISI is represented as the difference, $\Delta_1$, between the value of the sample and the value, at that sample time, of the dashed line corresponding to the mark of samples 15–16. This ISI is associated with the mark of samples 19–21.

For sample 18, the amount of ISI is represented as the difference, $\Delta_1$, between the value of the sample and the value, at that sample time, of the dashed line corresponding to the mark of samples 19–21. This ISI is associated with the mark of samples 15–16. For sample 23, the amount of ISI is represented as the difference, $\Delta_2$, between the value of the sample and the value, at that sample time, of the dashed lines corresponding to either the mark of samples 19–21 or the mark of samples 25–31.

As also shown in FIGS. 1(a) and 1(b), samples 2, 3, 6, 7, 10 and 11 correspond to spaces in the reference field. While these samples are depicted as non-zero, they represent binary zeroes. The samples are so depicted to illustrate bandwidth limitations associated with resolution. However, samples 6 and 7 are also so depicted to illustrate the effect of ISI. For sample 6, the amount of ISI is represented as the difference, $\Delta R$, between the value of the sample and the value, at that sample time, of the dashed line corresponding to the mark of samples 4–5. This ISI is associated with the mark of samples 8 and 9. For sample 7, the amount of ISI is represented as the difference, $\Delta_R$, between the value of the sample and the value, at that sample time, of the dashed line corresponding to the mark of samples 8–9. This ISI is associated with the mark samples 4 and 5.

According to the principles of the invention, the ISI associated with selected reference marks is employed to determine cancellation of ISI from selected samples of the data marks. More specifically, the ISI of spaces among the reference marks preferably is employed to obtain a value of detected ISI which, in turn, is employed to derive an ISI cancellation value, the ISI cancellation value being applied to selected samples of the data marks. The detected ISI is obtained by comparing the detected values of selected samples in the reference field (e.g., such as samples 6 and 7) to predetermined values, the predetermined values following from knowledge of the relationship among and nature of the reference marks among which the samples are located.

The reference field preferably has patterns of marks and spaces selected to optimize one or more functions. An example is the function of adaptively obtaining detected ISI and/or deriving ISI cancellation values (e.g., for application to selected samples, such as samples 17, 18 and 23 above). As to doing so for detected ISI, it is preferred that the reference field has a pattern likely to provide detected ISI that reflects the worst case ISI likely to occur in association with the data field. As an example, the patterns preferably have a minimum space-distance between marks, such space-distance complying with coding (e.g., 1,7RLL, 2,7RLL, NRZ, 8/9, EFM+, etc.).

The reference marks can be variously provided. The reference marks preferably comprise either or both (i) a selected number of predetermined marks located in one or more of the frames and (ii) preamble bytes associated with each sector. In one embodiment, the predetermined marks comprise two marks located in a frame's recordable field and covering twelve channel bits, as shown in FIGS. 1(a) and (b). In this embodiment, the predetermined marks preferably are repeated in each frame such that they are interleaved in the user data, e.g., the user data of one logical sector typically being stored in plural frames with each frame including the predetermined marks.

In another embodiment, the preamble bytes preferably are twelve in number (e.g., where the user data bytes are 2048 in number) and comprise two marks per byte (i.e., 24 total marks), all of which marks are located in the recordable field of the first frame associated with the sector.

In another embodiment, the preamble bytes correspond to the predetermined marks. For example, the two predetermined marks are employed 1 to 12 times in the sector's first frame in providing the preamble. In so doing, functions associated with the marks can be implemented based on one or more algorithms and using isolated and/or redundant reference mark information.

If the preamble consists of 12 occurrences of the predetermined marks, the samples preferably are averaged over the 12 bytes in obtaining detected ISI and/or the derived ISI cancellation value at the beginning of each sector. Thereafter, the detected ISI and/or the derived ISI cancellation value preferably are obtained, adjusted or updated using predetermined marks in one or more frames subsequent to the first frame of the sector, e.g., either non-preamble marks or subsequent preamble marks (hereinafter, the term "adaptive acquisition" is sometimes used to refer to any or all of obtaining, adjusting and/or updating respective detected ISI and/or the ISI cancellation value).

As an example, the detected ISI is updated or adjusted based on predetermined marks located in one or more frames subsequent to the first frame of the sector (e.g., redundant reference mark information). The update/adjustment can be based on such predetermined marks either individually from a frame, or in groups or collectively across frames. In this example, the ISI cancellation value preferably is derived from the detected ISI associated with the subsequent frames' predetermined marks, the cancellation value thereby being updated on an ongoing basis. It is understood, however, that the ISI cancellation value can also be updated from one or more of the subsequent frames' predetermined marks in the absence of adjustments to the detected ISI, without departing from the principles of the invention.

As another example, the detected ISI is obtained based solely on the predetermined marks located in one or more frames subsequent to the first frame of the sector (e.g., isolated reference mark information). In this example, the ISI cancellation value preferably is obtained on an ongoing basis by derivation from each detected ISI in sequence.

Although the reference marks can be provided as specifically described above, it is understood that such marks can be otherwise provided without departing from the principles of the invention. For example, while the above-description locates the reference marks in the recordable fields of the frames, it is understood that some or all of the marks can be provided as preformatted marks. However, it is preferred that the marks are recorded with the user data in the recordable field so that the reference marks are subject to write parameters prevailing as the user data is written.

Detected ISI and ISI Cancellation Value

It is to be understood that the detected ISI is obtainable from information of the reference field using various arrangements. Referring to FIGS. 1(a) and (b), examples of arrangements include:

1) Detect the values of sample 2 or 11 against a predetermined reference value; or
2) Detect and average the values of both samples 2 and 11 against a predetermined reference value; or
3) Detect the values of samples 3 and 6, and find the difference between these values; or
4) Detect the values of samples 7 and 10, and find the difference between these values; or
5) Detect the values of samples 3, 6, 7, and 10, average the values of samples 6 and 7, average the values of samples 3 and 10, find the difference between the first and second averages; or
6) Combinations of the above.

Notwithstanding the above example arrangements, it is understood that other arrangements can be implemented in obtaining detected ISI (e.g., interpolation, multiple alternative computations, and the like), without departing from the principles of the invention.

In the first example, it is preferred that the detected ISI be obtained by (i) digitizing the read signal via an appropriately fast analog-to-digital converter, and (ii) acquiring the applicable sample for storage in a register. In the second example, it is preferred that the detected ISI be obtained by (i) digitizing the read signal via an appropriately fast analog-to-digital converter, (ii) acquiring sample 2 for storage in a register, (iii) acquiring sample 11, (iv) adding sample 11 to sample 2 in the register and (v) shifting the contents of the register by one bit after the addition, thereby obtaining the average of the addition's result. In the fifth example, one approach is to obtain the averages (e.g., following the second example) so as to accumulate the difference therebetween in a register. In the third and fourth examples, it is preferred to follow the approach of the first example so as to obtain the values and, in addition, to follow the approach of the fifth example so as to accumulate the difference therebetween.

It is to be understood that the ISI cancellation value preferably is derived from the detected ISI. As an example, the ISI cancellation value is derived by setting it equal to the detected ISI. As another example, the ISI cancellation value can be derived using an offset of a predetermined amount from the detected ISI. As yet another example, the ISI cancellation value can be derived using a calculation based on the detected ISI. Where either of the latter two approaches are implemented, it is preferred that the derivation be based on factors which tend to enhance the ISI cancellation function and the results therefrom. As an example, the derivation can compensate for amplitude variation among or within frames and sectors. In any case, it is understood that the ISI cancellation value may be otherwise derived without departing from the principles of the invention.

FIGS. 1(a) and (b) also illustrate that ISI cancellation preferably is applied only spaces of the data field.

ISI Cancellation Method

FIGS. 1(a) and (b) illustrate a read signal. The read signal has two initial reference marks, these marks being followed, in a data field, by marks and spaces in a 1,7RLL coding sequence. As previously stated, samples 17 and 18 have levels that reflect not only bandwidth limitations, but also ISI. Moreover, as illustrated, ISI has raised these samples' levels near to the detection threshold TH. As to these samples, then, the tendency for a read error typically increases, e.g., responsive to noise and/or threshold transients.

Accordingly, the ISI cancellation method is directed to identify samples such as samples 17 and 18. Moreover, the ISI cancellation method is directed to so identify samples selectively: preferably only those samples that are significantly affected by ISI are selected for ISI cancellation. In addition, the ISI cancellation method is directed to be adaptive: as described above, the ISI cancellation value preferably is adaptively acquired from information of the reference field (e.g., including from information relating to one or both of preamble marks and interleaved marks).

In the method based on FIGS. 1(a) and (b), the read signal is sampled at channel bit locations to obtain main and neighbor samples. These samples are tested against selected cancellation criteria to determine whether ISI cancellation is to be effected. For this illustration, the cancellation criteria are satisfied if a main sample has a level that is less than the levels of both of the two neighbor samples disposed at predetermined distances (here, two channel bits) from the main sample. Stated more generally, in the case of one main and two neighbor samples, cancellation criteria typically comprise determining that a common arithmetic sign is associated with the differences between the levels of the main sample and each of the respective neighbor samples.

ISI cancellation is effected by applying the ISI cancellation value to the main sample's level. As a general example, the ISI cancellation value preferably is applied by subtracting (adding) that value from (to) the main sample's level.

So as to preclude inappropriate selection of a sample for ISI cancellation, the main sample preferably is selected for ISI cancellation only if a preclusion function is satisfied. The preclusion function preferably uses a selected cancel trigger value, such that ISI cancellation is effected provided that the trigger value is exceeded by the difference between the levels of (i) the main sample and (ii) selected of the neighbor samples. In the illustrated example, ISI cancellation is effected where the trigger value is exceeded by the difference between the levels of (i) the main sample and (ii) both of the neighbor samples. Also in the illustrated example, in the absence of the trigger comparison, sample 29 is subject to being inappropriately selected in that the levels of samples 27 and 31 both exceed the level of sample 29, but such excess is due to ripple and/or noise, and not to ISI. As described further below, the cancel trigger value preferably is derived from information of the reference field.

As is also described further below, the distance between the main sample and the neighbor samples preferably is selected to optimize ISI cancellation. The selection typically responds to factors, such as coding. In the case of 1,7RLL coding, for example, the distance preferably is two channel bits on either side of the main sample.

ISI Cancellation Circuit

Figure 2:
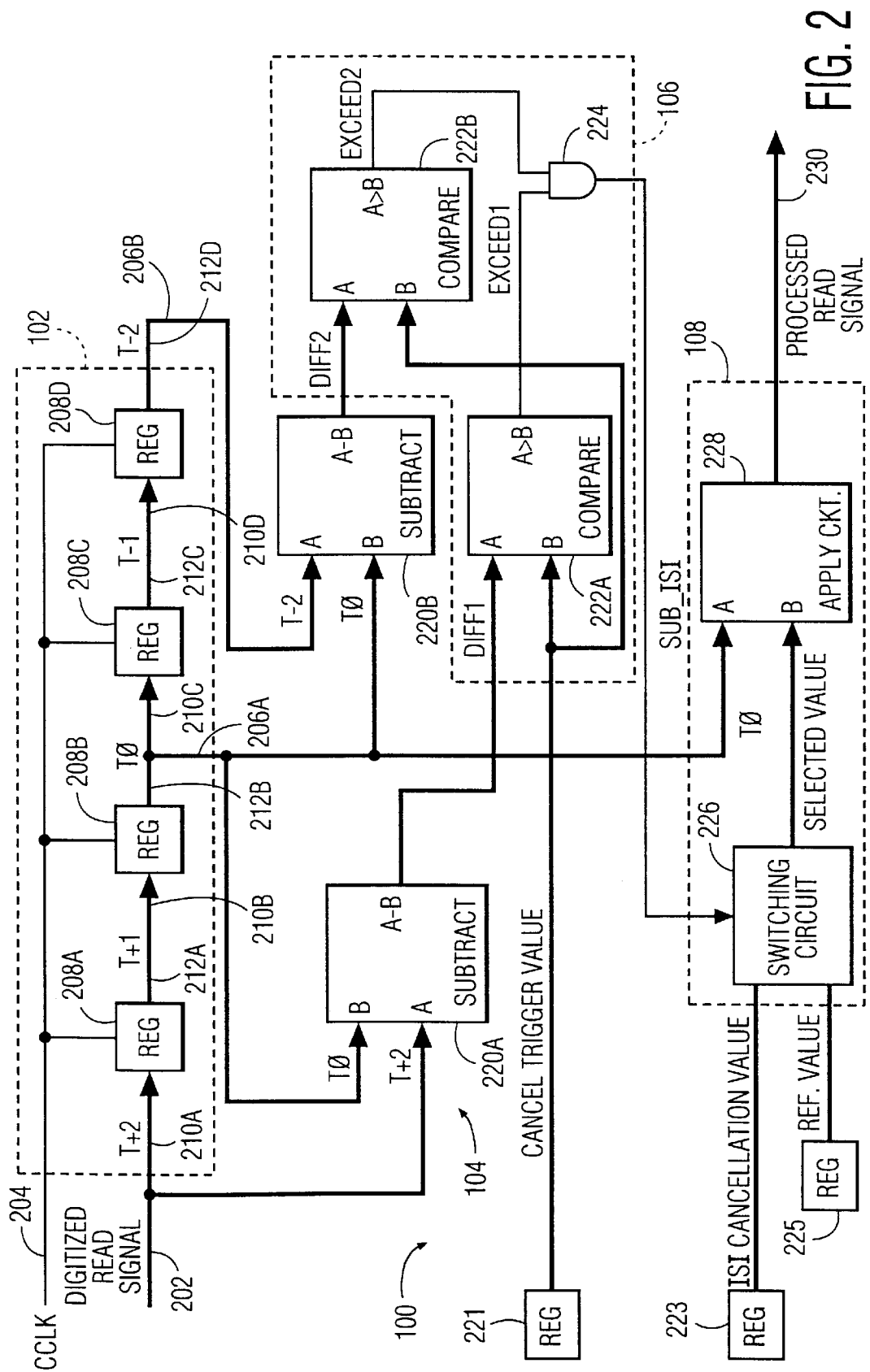
FIG. 2 is a block diagram of an ISI cancellation circuit associated with a read channel, in accordance with the present invention.

Referring to FIG. 2, an ISI cancellation circuit 100 is shown, in accordance with the present invention. ISI cancellation circuit 100 comprises sample logic 102, arithmetic logic 104, sample selection logic 106 and cancellation logic 108. In the illustrative embodiment shown in FIG. 2, circuit 100 is implemented responsive to 1,7RLL coding.

The sample logic 102 receives a digitized read signal 202 and generates a main and two neighbor signals comprising main and neighbor samples, the main samples being selectively chosen for ISI cancellation. Sample logic 102 has selected taps 206A and 206B, and is clocked by a channel clock 204 (CCLK).

Sample logic 102 also has memory elements 208A, 208B, 208C and 208D. Each of the memory elements 208A–D receives the CCLK 204 and is one bit deep so as to introduce a one clock cycle delay. The memory elements 208A–D have respective input terminals 210A–D and output terminals 212A–D. The output terminal 212A is coupled to the input terminal 210B; the output terminal 212B is coupled to the input terminal 210C; and the output terminal 212C is coupled to the input terminal 210D. The output terminals 212B and 212D are coupled to taps 206A and 206B, respectively.

The input terminal 210A receives the digitized read signal 202. Accordingly, as clocked by CCLK 204, the digitized read signal is provided (i) at tap 206A after two clock cycles of delay following receipt at input terminal 210A and (ii) at tap 206B after four clock cycles of delay following such receipt, i.e., two clock cycles of delay following provision at tap 206A. For the discussions that follow, (a) T0 denotes the main signal, i.e., samples of the delayed digitized read signal as provided at tap 206A, (b) T–2 denotes a first neighbor signal, i.e., samples of the delayed digitized read signal as provided at tap 206B and (c) T+2 denotes a second neighbor signal, i.e., samples of the digitized read signal 202 as received by the ISI cancellation circuit 100.

Taps 206A and 206B and input terminal 210A are coupled to arithmetic logic 104. Arithmetic logic 104, as illustrated, comprises subtractors 220A and 220B. In this example, the tap 206A is coupled to each of subtractors 220A and 220B, while subtractor 220A is also coupled to the input terminal 210A of memory element 208A, and while subtractor 220B is also coupled to tap 206B. Subtractor 220A subtracts each sample of T0 from a corresponding sample of T+2 to provide an output signal Diff1. Subtractor 220B subtracts each sample of T0 from a corresponding sample of T–2 to provide an output signal Diff2.

The output signals Diff1 and Diff2, as shown, are provided to sample selection logic 106. Sample selection logic 106, as illustrated, comprises comparators 222A and 222B. Comparators 222A and 222B compare respective output signals Diff1 and Diff2 to a selected cancel trigger value and, based thereon, provide respective signals Exceed1 and Exceed2. Although the cancel trigger value is shown provided to the comparators 222A and 222B from a memory element 221, it is to be recognized that the cancel trigger value can be otherwise provided without departing from the principles of the invention.

The comparison to a cancel trigger value preferably is implemented so as to preclude selection of samples for ISI cancellation (the "preclusion function"). Selection is precluded, for example, based on non-ISI deviations in sample levels at the applicable delay points. Such deviations can be due to, e.g., noise and/or ripple. As previously described, in the absence of the cancel trigger comparison, sample 29 of FIG. 1(a) could be selected in that samples 27 and 31 both exceed sample 29, such selection being undesirable.

In implementing the preclusion function, it is preferred that the cancel trigger value be derived from information of the reference field. As one example, the cancel trigger value is set to a fraction (e.g., one-half) of the ISI cancellation value. As another example, the cancel trigger value is set based on characterization of ripple, such as by including appropriate mark(s) and/or spaces in the reference field. As yet another example, the cancel trigger value is based on characterization of channel noise. As still another example, the cancel trigger value is based on a combination of one or more of the above, with or without additional parameters. In any case, it is understood that other trigger setting approaches can be used without departing from the principles of the invention.

The preclusion function can be selectively disabled or not implemented. In either case, the cancel trigger value preferably is set to a reference amplitude, e.g., zero. So setting the cancel trigger value provides that the Exceed1 and Exceed2 signals represent determinations as to whether a sample of T0 has an amplitude that is exceeded by the amplitudes of neighbor samples of T+2 and T–2, respectively.

The Exceed1 and Exceed2 signals are provided as inputs to control logic 224 of sample selection logic 106. Control logic 224, in this illustration, is implemented as an AND gate. Control logic 224 provides, as an output, a Sub-ISI signal which is received by and controls the cancellation logic 108.

The cancellation logic 108 comprises applying circuit 228 coupled, through operation of switching circuit 226, to one of memory elements 223 and 225. The switching circuit 226 receives and is controlled by the Sub-ISI signal. The switching circuit 226 also receives, as inputs, a signal from memory element 223 comprising the ISI Cancellation Value and a signal from memory element 225 comprising a Reference Value. The Reference Value is selectable, but preferably is zero. Although the ISI Cancellation Value and the Reference Value are shown provided to the switching circuit 226 from respective memory elements 223 and 225, it is to be recognized that these Values can be otherwise provided, without departing from the principles of the invention.

The switching circuit 226 provides an output signal, Selected Value, as an input to the applying circuit 228. Based on the Sub-ISI signal's control of the switching circuit 226, Selected Value comprises either the ISI Cancellation Value or the Reference Value.

In addition to being coupled to the switching circuit 226, the applying circuit 228 is coupled to tap 206A. Accordingly, in addition to Selected Value, the applying circuit 228 also has as an input each sample of T0.

In operation, the applying circuit 228 applies Selected Value to each sample of T0 and, thereby provides an output signal. The output signal, shown as Processed Read Signal 230, is as follows: (a) when a sample of T0 is selected for ISI cancellation, the output signal reflects application of the ISI Cancellation Value to the respective T0 sample and (b) hen the sample of T0 is not so selected, the output signal reflects application of the Reference Value to the respective T0 sample.

As illustrated, the switching circuit 226 preferably is implemented as a two input multiplexer under control of the Sub-ISI signal received from the sample selection logic 106. Moreover, the applying circuit 228 preferably comprises a subtractor. In such case, the applying circuit 228 applies the Selected Value by subtracting it from the respective T0 sample.

The ISI cancellation circuit 100 of the illustration, as previously described, is responsive to 1,7 run-length-limited (RLL) modulation code. For example, the circuit 100 comprises sample logic 102 having four memory elements 208A–D, these elements having taps 206A and 206B and introducing clock cycle delays such that, as clocked by CCLK 204, the digitized read signal is provided (i) at tap 206A after two clock cycles of delay following receipt at input terminal 210A and (ii) at tap 206B after two clock cycles of delay following provision at tap 206A. So configured, the sample logic 102 is enabled to provide (a) the main signal T0 of samples at tap 206A, (b) a first neighbor signal T−2 of samples at tap 206B and (c) a second neighbor signal T+2 of samples as such signal is originally received by the ISI cancellation circuit 100. Generally, this implementation responds to the d-constraint of the RLL coding: because the d-constraint defines the minimum distance between channel-bit transitions, the d-constraint determines the distance of the two neighbor signals of samples to be evaluated in determining whether samples in the main signal are subjected to ISI cancellation.

For codes other than 1,7RLL, the d-constraint typically changes. Responsive thereto, the ISI cancellation circuit 100 typically is implemented differently than as illustrated. As an example, the sample logic 102 typically is implemented with a different number of memory elements 208 and/or differently-distanced taps 206, so as to provide main and neighbor signals having an appropriate delay relationship. Table 1 shows, for various example codes, the d-constraint and distance of ISI neighbors (in channel-bits).

TABLE 1

| Code | D-constraint | Distance of ISI Neighbors |
| --- | --- | --- |
| NRZ | d = 0 | 1 |
| 8/9 | d = 0 | 1 |
| 1,7RLL | d = 1 | 2 |

TABLE 1-continued

| Code | D-constraint | Distance of ISI Neighbors |
| --- | --- | --- |
| 2,7RLL | d = 2 | 3 |
| EFM+ | d = 2 | 3 |

Figure 3:
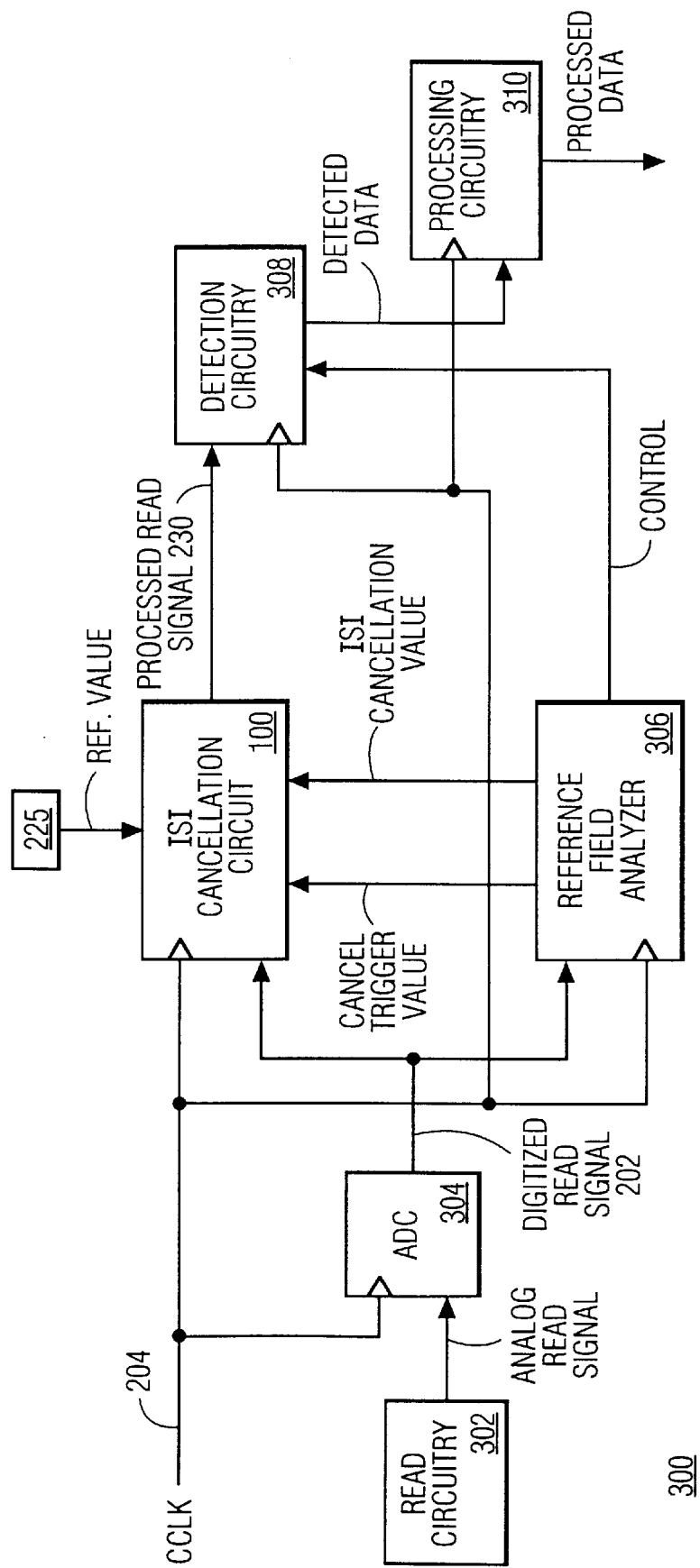
FIG. 3 is a block diagram of a storage system, the system including an ISI cancellation circuit associated with a read channel, in accordance with the present invention.

FIG. 3 is a block diagram of a storage system 300, in accordance with the present invention. The storage system 300 comprises (i) read circuitry 302 that provides for reading the storage media so as to generate an analog read signal, (ii) an analog to digital converter (ADC) circuit 304 that receives the analog read signal and generates therefrom the digitized read signal 202, (iii) reference field analyzer 306 which receives the digitized read signal and, based on the marks and/or spaces of one or more reference fields, derives the ISI Cancellation Value and, if so implemented, the Cancel Trigger Value and detection control signals, (iv) memory element 225, which element provides the Reference Value, (v) the ISI cancellation circuit 100 which receives the digitized read signal, the Cancel Trigger Value, the ISI Cancellation Value and the Reference Value and generates Processed Read Signal 230, such signal 230 comprising a read signal from which ISI is adaptively and selectively canceled, (vi) detection circuitry 308 which (a) receives both the Processed Read Signal 230 from the ISI cancellation circuit 100 and the detection control signals from the reference field analyzer 306 and (b) generates an output signal comprising detected data (e.g., a sequence of transitions), and (vii) processing circuitry 310 for processing the data of the detection circuitry's output signal. The system 300 also preferably comprises the channel clock (CCLK) 204, which is applied to and clocks each of the above components.

The detection circuitry 308 can be variously implemented within the principles of the invention. As an example, the circuitry 308 can be implemented to provide conventional bit-slice technology. As another example, the circuitry 308 can be implemented to provide an adaptive bit-slice technology. As yet another example, the circuitry 308 can be implemented to provide maximum likelihood detection mechanism, as such mechanism is described in the U.S. patent application of Johannes J. Verboom and Fred N. Wamble, Ser. No. 08/994,874, filed Dec. 19, 1997, and entitled METHOD AND APPARATUS FOR MAXIMUM LIKELIHOOD DETECTION, which is hereinabove incorporated by reference.

In each case, it is preferred that the detection circuitry 308 be coupled to the reference field analyzer 306 so as to receive detection control signals which are relevant to operation of the detection circuitry 308. As to a maximum likelihood detection mechanism, the detection control signals indicate, e.g., the clip level applicable to the digitized read signal.

As to both conventional and adaptive bit-slice technology, the detection control signals preferably indicate the detection threshold applicable to each sample. For conventional bit slice technology, the detection threshold typically is fixed, being derived from selected samples of the reference field (e.g., the detection threshold is based on the average of samples 3, 4, 9 and 10). For adaptive bit slice technology, the detection threshold tends to vary. As an example, the detection threshold can be derived from samples of spaces in the reference field, these spaces selected as being subject to ISI (e.g., the detection threshold is based on the average of samples 5, 6, 7 and 8).

The system 300 can be otherwise implemented without departing from the principles of the invention. As an example, the detection circuitry can generate its own detection control signals, rather than receiving these signals from the reference field analyzer 306. In such case, the Processed Read Signal 230 preferably comprises reference field information. As another example, the Reference Value can be provided by other than the memory element 225. To illustrate, the Reference Value may be generated by the reference field analyzer 306, e.g., based on reference marks and/or spaces. As yet another example, so as to provide each or any of the Reference Value, the Cancellation Trigger Value, and the ISI Cancellation Value, the system 300 preferably comprises respective registers for updating/adjusting each such Value.

Conclusion

The present invention provides systems, methods and apparatus for recovering data from recording media, including, for example, magnetic disk, optical disk, optical tape, and magneto-optical systems. An example advantage of embodiments of the present invention is that the bit error rate in detection is controlled, notwithstanding ISI, as storage capacity is increased.

It will be understood that various other changes in the details, materials, and arrangements of the parts and steps which have been described and illustrated in order to explain the nature of this invention may be made by those skilled in the art without departing from the principles and scope of the invention as expressed in the subjoined Claims.

What is claimed is:

1. A circuit, the circuit providing for canceling inter-symbol interference from samples of a read signal in storage technologies, the read signal comprising samples associated with a reference field, the circuit comprising:
sample logic, the sample logic providing a main sample and one or more selected neighbor samples from the read signal;
arithmetic logic coupled to the sample logic, the arithmetic logic comparing the main sample to the neighbor samples toward determining satisfaction of selected cancellation criteria; and
cancellation logic coupled to the arithmetic logic and to the sample logic, the cancellation logic receiving the main sample and selectively effecting ISI cancellation when the cancellation criteria are determined to be satisfied.

2. A circuit as claimed in claim 1, further comprising an ISI cancellation value circuit, said circuit being coupled to the cancellation logic and providing an ISI cancellation value to the cancellation logic, the cancellation logic effecting ISI cancellation by applying the ISI cancellation value to the main sample.

3. A circuit as claimed in claim 2, wherein the ISI cancellation value circuit comprises a reference mark analyzer.

4. A circuit as claimed in claim 1, wherein the sample logic selects neighbor samples responsive to the coding of the read signal.

5. A circuit as claimed in claim 1, wherein the arithmetic logic determines level differences between the main sample and each of a selected plurality of neighbor samples and determines whether such level differences have a common arithmetic sign.

6. A circuit as claimed in claim 1, further comprising sample selection logic, the sample selection logic being coupled to the cancellation logic, the sample selection logic implementing a preclusion function so as to preclude effecting ISI cancellation as to a selected main sample.

7. A circuit as claimed in claim 6, further comprising a cancel trigger circuit coupled to the sample selection logic, the cancel trigger circuit providing a cancel trigger value.

8. A circuit as claimed in claim 6, wherein the cancel trigger circuit comprises a reference field analyzer.

9. A circuit as claimed in claim 6, wherein the cancellation logic comprises a switching circuit and an application circuit, the application circuit receiving the main sample, and the switching circuit receiving both the ISI cancellation value and a reference value, the switching circuit further receiving a control signal from the sample selection logic so that, responsive to the control signal, the switching circuit provides a selected value comprising one of the ISI cancellation value or the reference value, the selected value being received at the application circuit and the application circuit applying said selected value to the main sample.

10. A method of canceling inter-symbol interference from samples of a read signal in storage technologies, the read signal comprising samples associated with a reference field, the method comprising:
obtaining an ISI cancellation value in association with selected samples associated with the reference field;
selecting a main sample from the read signal;
selecting one or more neighbor samples from the read signal, the neighbor samples being disposed at predetermined distances, in channel bits, from the main sample;
comparing the main sample to each of the neighbor samples to determine satisfaction of selected cancellation criteria; and
applying, where the cancellation criteria are determined to be satisfied, the ISI cancellation value to the main sample.

11. A method as claimed in claim 10, wherein selecting of neighbor samples is responsive to the coding of the read signal.

12. A method as claimed in claim 10, wherein comparing the main sample to each of the neighbor samples to determine satisfaction of selected cancellation criteria comprises differencing the levels of the main sample and each of a selected plurality of neighbor samples, wherein differencing comprises subtracting the level of the main sample from the levels of two or more neighbor samples, such neighbor samples being at selected channel bit spacing from the main sample, and wherein determining satisfaction of selected cancellation criteria comprises determining that each said level subtraction yields a number having a common arithmetic sign.

13. A method as claimed in claim 12, further comprising effecting a preclusion function so as to selectively preclude effecting ISI cancellation as to a main sample, wherein effecting a preclusion function comprises (a) finding the differences between the main sample and selected of the neighbor samples, and (b) comparing one or more of said differences to a selected cancel trigger value, the cancel trigger value being derived from selected samples associated with the reference field, whereby ISI cancellation is effected for the main sample provided that one or more of the obtained arithmetic differences exceed the cancel trigger value, and (c) applying a reference value to the main sample when the preclusion function precludes effecting ISI cancellation respecting a main sample.

14. A method as claimed in claim 10, wherein obtaining the ISI cancellation value comprises deriving such value from samples associated with spaces disposed among selected marks of the reference field.

15. A method as claimed in claim 14, wherein obtaining the ISI cancellation value comprises comparing the values of selected one or more of the samples associated with spaces in the reference field against one or more predetermined values, each predetermined value following from knowledge of the relationship among and nature of marks among which the samples are located.

16. A method as claimed in claim 14, wherein obtaining the ISI cancellation value comprises selecting a pattern of marks and spaces for use in recording the read signal, so as to provide an ISI cancellation value representative of a worst case ISI likely to occur in association with the data field.

17. A method as claimed in claim 10, wherein obtaining the ISI cancellation value comprises obtaining a value of detected ISI from information associated with the reference field, and setting the ISI cancellation value equal to the value of the detected ISI, subject to an offset, the offset being either zero or a selected non-zero number.

18. A method as claimed in claim 17, wherein obtaining the detected ISI comprises using at least one of the following:

a) detecting the values of a selected sample of the reference field against a predetermined reference value;

b) detecting and averaging the values of one or more selected samples of the reference field against a predetermined reference value;

c) detecting the values of two selected samples of the reference field and finding the difference between these values;

d) detecting the values of four selected samples of the reference field, averaging the values of selected pairs of said samples, and finding the difference between the two averages; and e) adaptively acquiring detected ISI.

19. A method as claimed in claim 10, wherein obtaining the ISI cancellation value comprises adaptively acquiring the ISI cancellation value.

* * * * *